Sept. 11, 1945.  J. Y. ROBERTSON  2,384,698
WATER POWER WHEEL
Original Filed June 28, 1943   3 Sheets-Sheet 1
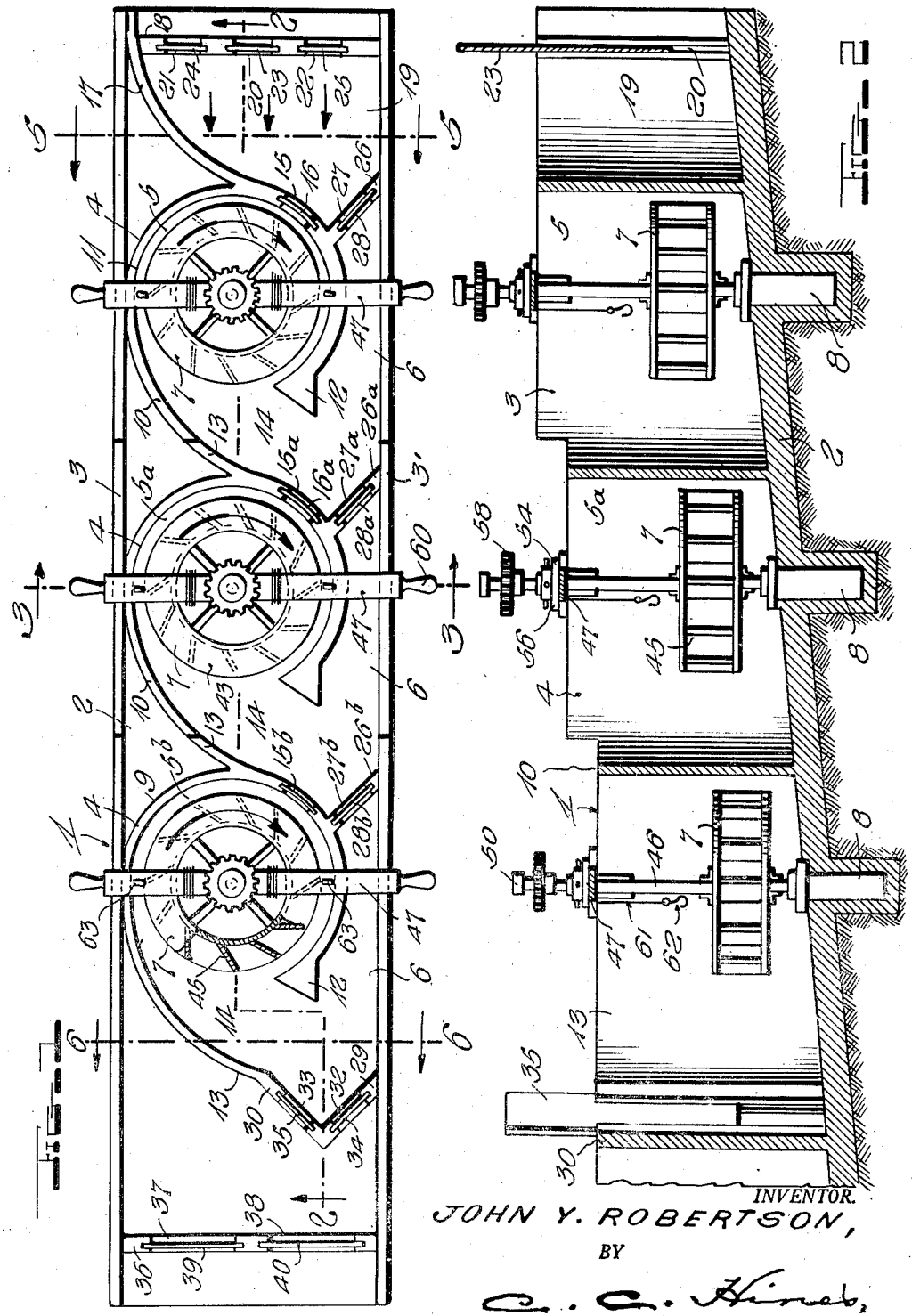
INVENTOR.
JOHN Y. ROBERTSON,
BY
ATTORNEY.

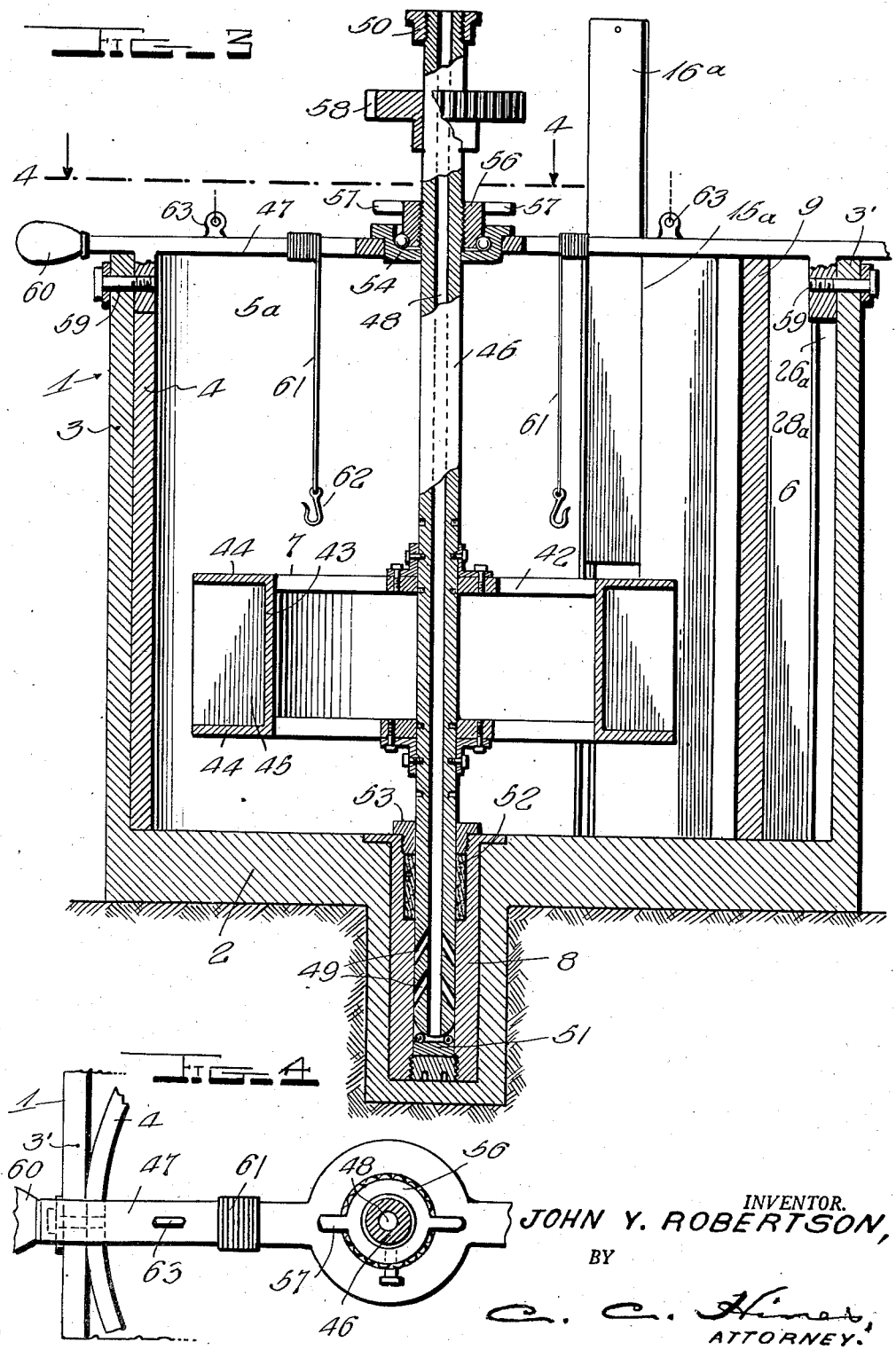

Sept. 11, 1945.　　　J. Y. ROBERTSON　　　2,384,698
WATER POWER WHEEL
Original Filed June 28, 1943　　　3 Sheets-Sheet 3
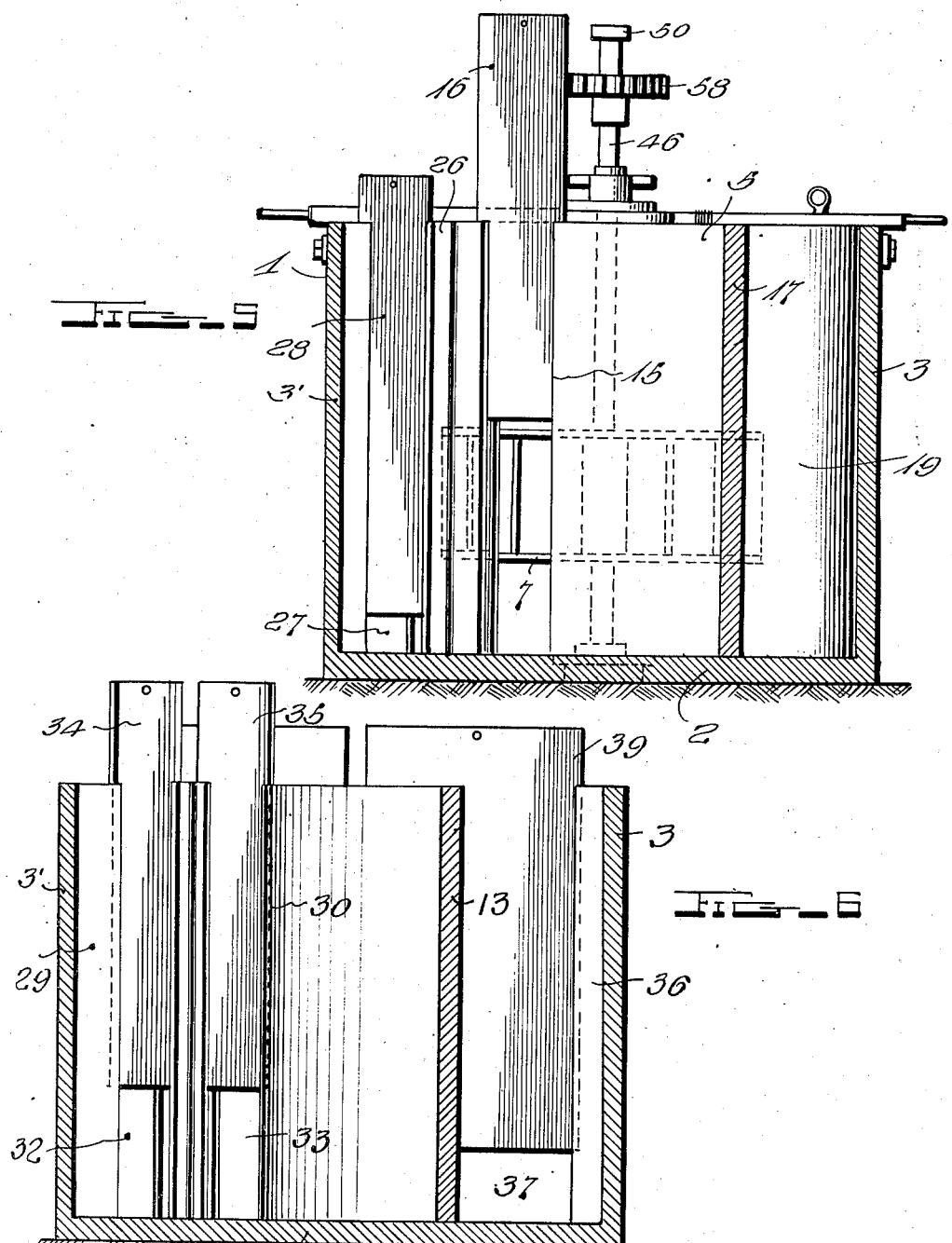
INVENTOR.
JOHN Y. ROBERTSON,
BY
ATTORNEY.

Patented Sept. 11, 1945

2,384,698

UNITED STATES PATENT OFFICE 2,384,698

WATER-POWER WHEEL

John Y. Robertson, El Paso, Tex.

Original application June 28, 1943, Serial No. 492,619. Divided and this application December 10, 1943, Serial No. 513,771

6 Claims. (Cl. 170—117)

This invention relates to improvements in water power wheels, and particularly to water turbine and like wheels designed for use in water power systems for utilizing the flow of water for transmitting power to drive any desired kind of apparatus or machinery.

The present application is a division of my prior application Ser. No. 492,619, filed June 28, 1943, which issued as Patent Number 2,342,223 on February 22, 1944, and applies to the construction of water wheel disclosed therein and which is adapted for use in such a system or other similar systems for developing power from a flowing water source.

The main object of the invention is to provide a water power wheel which is simple, strong and durable in construction and free running so as to develop a maximum amount of power available from the flowing source.

A further object of the invention is to provide a power wheel which is adjustable to a degree to compensate for wear of its bearings, which is adapted to be readily applied to a flume structure for use and removed for repairs or replacement as required, and which embodies novel bearing means capable of being readily kept lubricated to maintain it in working order over a long period of time.

In the accompanying drawings I have shown my invention as used in connection with a flume structure of the type disclosed in my aforesaid application, Ser. No. 492,619, and in these drawings:

Fig. 1 is a top plan view of a water power system, showing the use therein of a number of my improved water power wheels.

Fig. 2 is a longitudinal section of the same taken on line 2—2 of Fig. 1.

Fig. 3 is a vertical transverse section on an enlarged scale taken, for example, on line 3—3 of Fig. 1 through the flume, one of the water wheel chambers and the wheel therein, and showing particularly the wheel mounting.

Fig. 4 is a fragmentary sectional plan view taken on line 4—4 of Fig. 3.

Figs. 5 and 6 are vertical transverse sections on an enlarged scale, taken, respectively, on the lines 5—5 and 6—6 of Fig. 1.

Referring now more particularly to the drawings, 1 designates a flume which may be either curved or straight or embody both curved and straight portions, and which may be of suitable width and depth and constructed of concrete, metal, wood or any desired combination of these materials. This flume comprises in general a bottom wall 2, side walls 3, 3' and partitions 4, the last-named forming a desired number of turbine or water wheel chambers or compartments 5, 5ª, 5ᵇ and a raceway 6 common to all of said chambers or compartments. Three such chambers or compartments are shown in the present instance, in each of which is arranged a horizontally rotatable turbine or water wheel 7 of a novel construction and mounting hereinafter more fully described, but it is to be understood that any length of flume and number of chambers or compartments and water wheels arranged in succession therein may be employed according to working conditions and the amount of power to be developed and transmitted for use. The chambers are arranged in alinement mainly on one side of the longitudinal center of the flume and their outer sides join the side wall 3 of the flume, while the raceway 6 is arranged between the inner sides of the chambers and opposite side wall 3' of the flume. From the head end to the tail end of the flume the flume and chambers are formed so as to dispose the chambers and their flume portions in stepped relation, each at a desired lower level from the one preceding it, so that the chambers and flume slope at a required angle to give a desired head flow or velocity to the water supplemental to any normal head flow which it may have. Each chamber 5, 5ª, 5ᵇ is provided with a central depending bearing sump or well 8 which extends downward through the bottom wall 2.

The forming partition 4 of each chamber 5, 5ª, 5ᵇ comprises a main chamber forming wall portion 9 and a deflector forming wall portion 10. The wall portion 9 is concentric with the bearing sump and axis of the wheel 7 and extends through an arc of about 250 degrees from one end 11 thereof adjoining the flume wall 3 about the sides and head portion of the chamber and terminates at its opposite end 12 at the discharge side of the chamber between the longitudinal center of the flume and the raceway 6, while the wall portion 10 extends on a curved line from the first-named end 11 of the wall portion 9 adjoining the wall 3 outwardly and rearwardly away from the discharge side of the wheel and toward the flume wall 3' at a tangent to the wheel and eccentric to its axis and terminates at its free end 13 beyond the free end 12 of the wall portion 9. A flaring discharge passage 14 is thus formed at the rear of the chamber which opens between the wall ends 12 and 13 into the raceway 6 and the wall 10 thus serves to deflect the spent water from the wheel rearwardly and at an angle to the circumference of the wheel toward the raceway and in a direction toward the tail end of the flume.

In the head portions of chamber walls 9 of the respective chambers are formed water inlet passages 15, 15a, 15b controlled by vertically sliding gates 16, 16a, 16b. Each of these passages is located in its chamber wall at one side of the longitudinal center of the flume and between the same and the raceway 6. Arranged at the head of the flume are partitions 17 and 18. The partition 17 extends on a curved line from the wall 3 to the wall 9 of the first wheel chamber 5 of the series and connects therewith about in line with the longitudinal center of the flume, while the partition 18 extends across the flume from side to side thereof to form a forebay or penstock 19 to which water is admitted from the source for flow to the water wheel. In the partition 18 are provided central and side passages 20, 21 and 22, controlled, respectively, by vertically sliding gates 23, 24 and 25, whereby a greater or less volume of water may be admitted from the source to the forebay 19 for passage to the water wheel chambers or raceway or both.

Arranged in the raceway 6 are partitions 26, 26a, 26b having passageways 27, 27a, 27b formed therein and a vertically sliding gate 28, 28a, 28b for controlling said passageways. Each of these partitions extends at an inward and rearward angle from the wall 3' to the wall 9 of the adjacent chamber and connects with the latter between the passageway 15 of said chamber and the raceway 6. A similar partition 29 is disposed in the raceway beyond the last chamber 5b of the series and between the same and the tail end of the flume. This partition 29 is joined to the end 13 of the wall 10 of the wheel chamber 5b of the series by a partition 30 arranged at right angles thereto, the two forming a V-shaped partition between said wheel chamber and a tailbay or tailstock 31 in which water may be confined until its final discharge from the flume. In these partitions 29 and 30 are passageways 32 and 33 controlled by vertically sliding gates 34 and 35. A partition 36 extends across the flume to control the discharge of the water from the bay 31. This may be provided with any desired number of outlet passages and control gates therefor. In the present instance two such passages 37 and 38 are shown controlled by gates 39 and 40.

The above described partitions and passages with their controlling gates provide for a novel flow control of the water to regulate the amount of water supplied to each wheel or to two or more wheels of the series as well as the flow of water through the raceway, as hereinafter fully described.

The water wheels or turbines 7 employed and constituting the present invention may be of any suitable construction, but as shown each is of wheel type and comprises a central hub or sleeve 41, spokes or arms 42 radiating therefrom, and a rim band 43 carried by the spokes or arms, said band being provided with upper and lower circular flanges 44 forming therewith a channeled rim in which are inclosed vanes or buckets 45 of either fixed or adjustable type, as desired. The hub or sleeve 41 is fixed to or adjustably mounted on a shaft 46 stepped and journaled at its lower end in the bearing sump 8 and journaled at its upper end in and supported by a crossbar or beam 47. The shaft 46 is hollow to provide a passage 48 for the reception and flow of lubricant through ducts 49 to the bearing surfaces in the sump. A threaded cap 50 may be provided at the upper end of the shaft to close and prevent entrance of dust and dirt to the passage 48. An antifriction thrust bearing construction 51 may be provided in the sump to insure greater ease of motion of the shaft, and suitable packing 52, secured in place by a gland 53, may be provided at the top of the sump to exclude water, dirt, grit and other foreign substances from the bearing surfaces in the sump. In practice the hub 41 may be secured by bolts to the shaft, where the wheel is to be secured for any reason at a fixed point on the shaft above the bottom of the wheel chamber, but, if desired, and as shown, the wheel may be adjustably secured to the shaft, as by the use of disks with hub portions adjustably secured, as by setscrews, to the shaft, and the lower hub disk may be formed to ride in a preferred lowermost position of adjustment of the wheel on the gland 53 or the sump body, to give maximum stability of support to the wheel under certain operating conditions.

The upper portion of the shaft 46 may have an antifriction bearing engagement with the bar or beam 47. As shown in the present instance, the shaft extends upwardly through a bearing cup 54 seated in an opening in and suitably fixed to the bar or beam. In this cup are disposed antifriction bearing balls 55 engaged by an adjustable bearing sleeve 56 having threaded engagement with the shaft, whereby the upper portion of the shaft is journaled for free rotation on the bar or beam. Hand grips 57 on this bearing sleeve adapt it to be conveniently rotated to adjust the shaft to bear properly on the upper and lower set of bearings and to compensate for wear on the bearings. The shaft may project to any desired extent above the bar or beam and be provided with a gear 58, a pulley or any other means for transmitting power from the rotating wheel to any machine or apparatus to be driven. Separate transmission gearing is preferably employed in connection with each wheel shaft so that power from each or any number of them may be transmitted to the same or different machines to be driven. The bar or beam 48 rests adjacent its ends on the flume walls 3, 3' and may be detachably secured to the walls against shifting while in use by means of bolts or other suitable fastenings 59. At the ends of the bar may be provided hand grips 60 by which, on removal of the bolts 59, it may be lifted off the flume and the attached wheel also conveniently lifted out of bearing engagement with the sump whenever it is desired to remove the wheel or replace it with a new one. To relieve the bearing connection between the shaft and bar or beam from strain while a wheel is being lifted out of or lowered into position, suitable supporting or draft connections may be provided. Those shown in the present instance consist of cables or chains 61 attached at one end to the bar or beam and having hooks or the like 62 at their free ends engageable with the wheel spokes to positively connect the bar or beam with the wheel. These cables may be wound up on the bar or beam when not in use to keep them elevated clear of the wheel. In case chains are used in place of the cables, the hooks may be engaged with links of the chain to hold the hooks and chains in an elevated position. In addition, draft eyes 63 or the like may be provided on the bar or beam to adapt it to be engaged with and lifted by a hoisting crane for greater convenience in the handling of a bar or beam and wheel of heavy type. Cover boards or plates of suitable character may in practice be used to close the top of the flume, if desired, and these may be removable so that access may be readily obtained to the flume at any point. The flume may be built as a unit of any one or any combination of the materials specified, or it may be built in sections of suitable form for assemblage to provide a flume of any given length, width and conformation.

In practice, with the gates 16 closed, gates in the partitions 18, 26, 26ª, 26ᵇ, 29, 30 and 37 may be opened to allow water to flow in quantity desired through the raceway without operating the wheels. In operating one or more wheels the gates in the partitions 18, 29, 30 and 37 may be opened as required to supply any given volume of water for use within a given period of time. Assuming that gates in the partitions 18, 29, 30 and 37 are open for flow of a required volume of water, it will be understood that upon opening gates 16, 28ª and 28ᵇ, while keeping gates 16ª, 16ᵇ and 28 closed, water may be supplied to operate the wheel in chamber 5 while the wheels in chambers 5ª and 5ᵇ remain idle. Similarly, by opening gates 16 and 16ª and keeping gates 16ᵇ, 28 and 28ª closed, the wheels in chambers 5 and 5ª may be operated while the wheel in chamber 5ᵇ remains idle and by opening all the gates 16, 16ª, 16ᵇ and keeping gates 28, 28ª, 28ᵇ closed the wheels in all the chambers may be operated and in such manner that the water from one chamber will flow to the following chamber. By opening gate 28, however, while keeping gates 28ª, 28ᵇ closed, an augmented supply of water may be fed to the wheel in chamber 5ª to rotate it faster than the wheels in chambers 5 and 5ᵇ, and by opening gates 28 and 28ª, while keeping gate 28ᵇ closed, an augmented supply of water may be fed to the wheels in the chambers 5ª and 5ᵇ to rotate the wheels therein at higher speed than the wheel in chamber 5 and at the same or different relative speeds. However, by proper adjustment of the gates all the wheels may be made to rotate fast or slow at the same speed or at different relative speeds to supply the same or different amounts of driving power for use. By proper regulation of the gates also water may be by-passed about or diverted from any one or more of the wheel chambers and employed to operate the wheel or wheels in any other chamber or chambers desired. Thus the amount of power which may be supplied to each wheel and the number of wheels operated at a time may be varied to supply any amount of power required and to furnish such power to a single machine or appliance or a number of machines or appliances to be driven.

From the foregoing description, taken in connection with the drawings, the construction and mode of operation of my novel and improved water wheel will be readily understood without a further and extended description, and it will be seen that it provides a wheel of sturdy type, adapted to be easily driven, capable of developing a maximum amount of the available power from the flowing source, and adapted to be operable over a long period, owing to the fact that its bearings may be readily kept lubricated and are protected from the action of elements which would otherwise cause undesirable friction and wear.

While the structure shown for purpose of example is preferred, it is to be understood that changes in the form, construction and arrangement of parts may be made within the scope of the appended claims without departing from the spirit or sacrificing any of the advantages of the invention.

Having thus described my invention, I claim:

1. In a water power wheel structure, a flume having a bottom bearing, a shaft journaled at its lower end in said bearing, a water wheel mounted on the shaft, a bar extending across and supported by the side walls of the flume, an upper bearing member rotatively mounting the shaft on the bar and coupling the shaft with the bar for raising and lowering movements therewith, and in which the upper portion of the shaft is journaled, and draft means for connecting the bar with the wheel and whereby on a lifting movement of the bar the weight of the wheel will be removed from the upper bearing and the wheel may be raised and the shaft removed from the bottom bearing.

2. In a water power wheel structure, a flume having a bottom bearing, a shaft journaled at its lower end in said bearing, a water wheel mounted on the shaft, a bar extending across and supported by the side walls of the flume, a stationary bearing member positively connected with the bar, a bearing member on the shaft and overlying and rotatably engaging the bearing member on the bar, and draft means for coupling the bar to the wheel to adapt the wheel to be raised and the shaft removed from the bottom bearing by upward movement of the bar and to sustain the weight of the wheel from the bar and remove the weight of the wheel from the upper bearing.

3. In a water power wheel structure, a flume comprising a bottom wall and side walls, the bottom wall having a bearing sump, bearing means at the base of the sump, packing means at the top of the sump, a shaft having its lower end extending downward through the packing into the sump and engaging said bearing means, said shaft being provided with a lubricant conducting channel formed therein and opening through its upper end and extending therefrom downward and having lateral outlets at its lower end communicating with the sump for supply of lubricant to the bearing surfaces, a water wheel mounted on the shaft, a bar extending across the flume between and supported by the side walls thereof, bearing means for the upper end of the shaft comprising a bearing member on the bar and a bearing member on the shaft resting on and rotatably engaging the bearing member on the bar, and draft means for coupling the bar to the wheel to adapt the wheel to be raised and the shaft removed from the bottom bearing by upward movement of the bar.

4. In a water power wheel structure, a flume having a bottom bearing sump, bearing means at the base of the sump, packing means at the top of the sump, a shaft having its lower end extending downward through the packing into the sump and engaging said bearing means, said shaft being provided with a lubricant conducting channel formed therein and opening through its upper end and extending therefrom downward and having lateral outlets at its lower end communicating with the sump for supply of lubricant to the bearing surfaces, a water wheel mounted on the shaft, a supporting bar, and bearing means on the bar for the upper end of the shaft.

5. In a water power wheel structure, a flume having a bottom bearing sump, bearing means at the base of the sump, packing means at the top of the sump, a shaft having its lower end extending downward through the packing into the sump and engaging said bearing means, a water-wheel mounted on the shaft, said shaft being provided with a lubricant conducting channel formed therein and opening outwardly at its upper end and provided at its lower end with lateral outlets inclined downwardly and outwardly and communicating with the sump for supply of lubricant to the bearing surfaces, and a support having bearings for the upper end of the shaft.

6. In a water power wheel structure, a flume having a bottom bearing sump, a bearing at the base of the sump, packing means at the top of the sump, a shaft having its lower end extending downward through the packing into the sump and engaging said bearing means, a water wheel mounted on the shaft, a bar adapted to be extended across the flume between and removably supported by the side walls thereof, a bearing for the upper end of the shaft comprising a lower bearing member on the bar and an upper bearing member on the shaft resting on and rotatably engaging the lower bearing member, and draft means for coupling the bar to the wheel to adapt the wheel to be raised without strain upon the upper bearing member and the shaft removed from the bottom bearing by upward movement of the bar.

JOHN Y. ROBERTSON.